A. B. COLLETTE.
PRESSURE GAGE.
APPLICATION FILED DEC. 26, 1916.

1,264,274.

Patented Apr. 30, 1918.

Inventor:
Austin B. Collette,
by his attorneys
Charles N. Gooding

UNITED STATES PATENT OFFICE.

AUSTIN B. COLLETTE, OF EVERETT, MASSACHUSETTS.

PRESSURE-GAGE.

1,264,274.    Specification of Letters Patent.    Patented Apr. 30, 1918.

Application filed December 26, 1916. Serial No. 138,995.

*To all whom it may concern:*

Be it known that I, AUSTIN B. COLLETTE, a citizen of the United States, residing at Everett, in the county of Middlesex and State of Massachusetts, have invented new and useful Improvements in Pressure-Gages, of which the following is a specification.

This invention relates to improvements in pressure gages and has for its object to provide simple and strong means for firmly securing gage springs, and particularly Bourdon springs, either to the back or bottom of a gage case so as to prevent any possible movement of said spring, other than that of expansion and contraction, relatively to the case due to the vibration of the pipes to which the gage may be attached or for similar reasons.

The invention consists in the combination and arrangement of parts set forth in the following specification and particularly pointed out in the claims.

Referring to the drawings.

Like numerals refer to like parts throughout the several views of the drawings.

Figure 1:
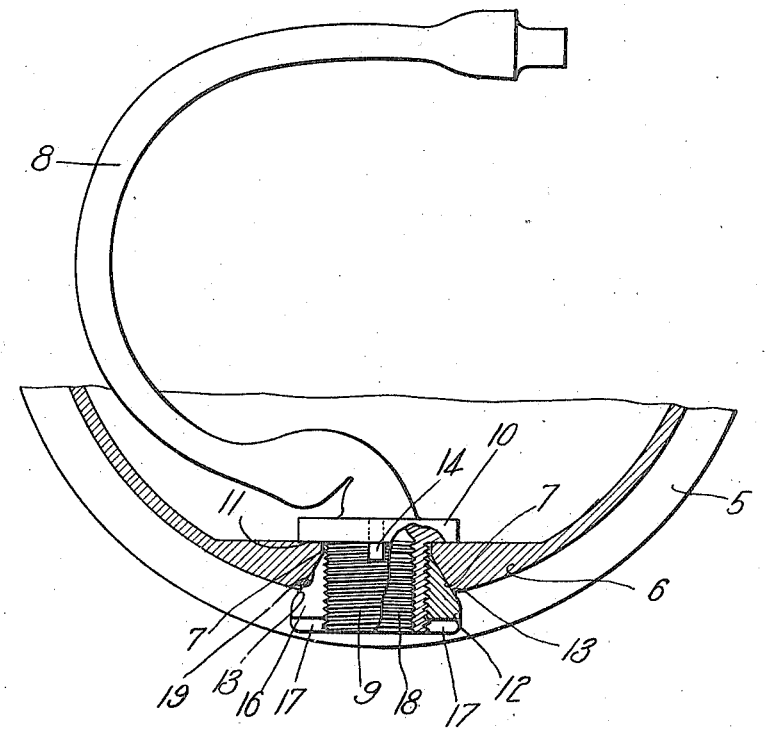
Figure 1 is a side elevation of a gage spring shown attached to the bottom of the gage case, only the immediate portion of said case being shown and that in section, the means for securing said gage spring to said case being also shown in section.

In the drawings, 5 is the bottom portion of a gage case, having the usual thickened portion 6 which, in the present instance, is provided with a hole 7 adapted to receive one end of the gage spring and is what is termed a bottom connection.

The hole 7 is preferably tapered at its outer end. 8 is a gage spring or tube of the well known Bourdon type, one end of which is externally screw threaded at 9 and the threaded end is arranged to extend through the hole 7, the smaller diameter of said hole being substantially equal to the outside diameter of the threaded end of said tube.

A flange 10, preferably integral with said spring 8, forms a shoulder 11 which engages the inner wall of the case 5 surrounding the hole 7. A conical sleeve 12 is arranged to fit the threaded portion 9 of said spring and is adapted to be moved longitudinally of said portion preferably by means of threads on said sleeve coöperating with the threads on said spring, when said sleeve is rotated, until the conical surface 13 thereof engages the tapered surface of the hole 7 and by so doing the shoulder 11 which is opposed to the conical end of said sleeve will be drawn firmly against its seat and thereby firmly secure the gage spring rigidly in said case 5.

Means have been provided for preventing the rotation of the spring 8 when the same is in position in said case and especially when said sleeve 12 is being rotated relatively thereto. The means referred to preferably include dowels 14, 14 which project from the flange 10 into recesses 15 in the adjacent wall of the case 5.

In order that the sleeve or what may be termed a nut 12 may more firmly embrace the threaded portion 9 of the spring and also the tapered portion of the case at the outer end of the hole 7, said nut is split at 16, preferably its entire length, one split being sufficient, although others may be employed, if desired. Said sleeve is further provided with notches 17 adapted to receive a spanner wrench whereby said sleeve may be rotated and firmly wedged between the threaded portion 9 and the adjacent portion of the case by said screw threads.

In the present form of spring, the threaded end 9 thereof is tapped at 18 to receive the end of the pipe which supplies the pressure for operating said gage. When the securing means hereinbefore described are employed for fastening the spring to the gage case all movement of said spring within the case other than that due to the expansion or contraction of said spring will be absolutely eliminated for the reason that the conical nut 12 and flange 10 coöperate to support said spring upon both the outer and inner faces of the case and in consequence of this the accuracy of the gage will not be affected by any vibration or thumping due to fluctuating pressures within the pipes which communicate with said gage.

By splitting the nut 12, as hereinbefore described, said nut will not only be forced firmly against the tapered walls of the hole 7 but the inner surface of said nut will also be firmly forced against the adjacent surface of the threaded end 9 of said spring and ordinarily the pressure thus exerted will be sufficient to prevent said nut from being accidentally loosened.

Figures 2, 3:
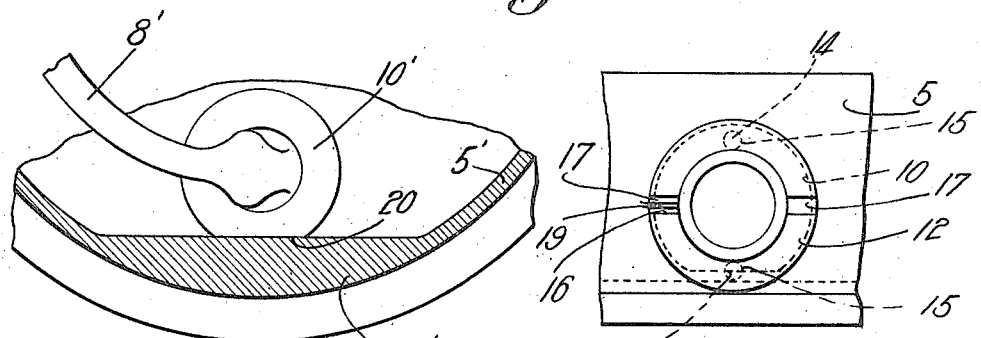
Fig. 2 is an underneath plan view of the gage case, illustrating the means for securing the spring to the case.
Fig. 3 is a detail view looking from the front of a gage spring case, illustrating a back connection and means for preventing the rotation of the spring within the case.

However, for safety, a portion of the material constituting the case 5 adjacent to the split in said nut may be forced as at 19 into said split, after said nut has been screwed up tight and thus provide a substantially permanent nut lock. The construction of the end of the spring for a back connection is practically the same as that illustrated in Fig. 1, but the means for securing the spring against rotation may be varied in the back connection, as illustrated in Fig. 3 and consists preferably in flattening one side of the flange 10' of the gage spring 8' as at 20, thus presenting a flattened surface against the thickened portion 6' of the case 5'.

Having thus specifically described my invention what I claim and desire by Letters Patent to secure is:

1. In combination, a gage case provided with a hole extending through the wall thereof, a gage spring having a threaded end extending through said hole, a shoulder on said spring to engage the inner wall of said case, a split conical nut engaging the threaded end of said spring to be moved thereon into engagement with the portions of said case surrounding the outer end of said hole, said nut being constructed and arranged to secure said spring to said case, and means formed from portions of the material constituting said case to be forced into the split in said nut after said nut has been screwed into place to prevent the rotation of said nut.

2. In combination, a gage case provided with a hole in the wall thereof, a gage spring having a threaded end extending into said hole, a shoulder on said spring to engage the inner wall of said case, a split conical nut engaging the threaded end of said spring adapted to be moved thereon into engagement with the portions of the material constituting said case and surrounding the outer end of said hole, said nut being constructed and arranged to secure said spring to said case, and means on said shoulder adapted to engage the inner portion of said casing to prevent the rotation of said spring during the movements of said nut thereon.

3. In combination, a gage case having a tapered hole extending through the wall thereof, a gage spring having one end thereof arranged in said hole, a flange formed adjacent to said end integral with said spring and arranged adjacent to the inner end of said hole, a conical sleeve adapted to fit the end of said spring, co-operating screw threads on said sleeve and said spring adapted to draw said sleeve toward said flange to secure said spring in said case, and dowels on said flange and interlocking with said case adapted to prevent rotary movement of said spring in said hole.

In testimony whereof I have hereunto set my hand in presence of two subscribing witnesses.

AUSTIN B. COLLETTE.

Witnesses:
 CHARLES S. GOODING,
 SYDNEY E. TAFT.

Copies of this patent may be obtained for five cents each, by addressing the "Commissioner of Patents, Washington, D. C."